(12) United States Patent
Seo

(10) Patent No.: US 10,241,922 B2
(45) Date of Patent: Mar. 26, 2019

(54) PROCESSOR AND METHOD

(71) Applicant: Samsung Electronics Co., Ltd., Suwon-si (KR)

(72) Inventor: Woong Seo, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 151 days.

(21) Appl. No.: 15/344,267

(22) Filed: Nov. 4, 2016

(65) Prior Publication Data

US 2017/0177491 A1 Jun. 22, 2017

(30) Foreign Application Priority Data

Dec. 17, 2015 (KR) .......................... 10-2015-0181076

(51) Int. Cl.
| | | |
|---|---|---|
| G06F 12/00 | (2006.01) | |
| G06F 12/0895 | (2016.01) | |
| G06F 12/0891 | (2016.01) | |
| G06F 12/0888 | (2016.01) | |
| H04L 12/861 | (2013.01) | |

(52) U.S. Cl.
CPC ...... *G06F 12/0895* (2013.01); *G06F 12/0888* (2013.01); *G06F 12/0891* (2013.01); *H04L 49/90* (2013.01); *G06F 2212/604* (2013.01)

(58) Field of Classification Search
CPC ............ G06F 12/0895; G06F 12/0891; G06F 12/0888; G06F 2212/604; H04L 49/90
See application file for complete search history.

(56) References Cited

U.S. PATENT DOCUMENTS

| | | |
|---|---|---|
| 6,515,963 B1 | 2/2003 | Bechtolsheim et al. |
| 2004/0064664 A1 | 4/2004 | Gil |
| 2004/0174814 A1 | 9/2004 | Futral |
| 2006/0136671 A1 | 6/2006 | Balakrishnan et al. |
| 2007/0297330 A1 | 12/2007 | Gusat et al. |
| 2012/0307838 A1 | 12/2012 | Manula et al. |
| 2014/0379992 A1* | 12/2014 | Dey .................... G06F 12/0808 711/135 |

FOREIGN PATENT DOCUMENTS

| | | |
|---|---|---|
| WO | 00/72530 A2 | 11/2000 |
| WO | 00/72530 A3 | 11/2000 |

OTHER PUBLICATIONS

Extended European Search Report dated Apr. 25, 2017 in co-pending European Application No. 16198478.6.

* cited by examiner

*Primary Examiner* — Kalpit Parikh
(74) *Attorney, Agent, or Firm* — F. Chau & Associates, LLC

(57) ABSTRACT

Provided is a processor including a plurality of devices. The processor includes a source processing device configured to identify data to request from another device, and a destination processing device configured to, in response to a request for the identified data from the source processing device using credit-based flow control, transmit the identified data to the source processing device using the credit-based flow control. The source processing device includes a credit buffer used for the credit-based flow control, the credit buffer being allocable to include a cache region configured to cache the transmitted identified data received by the source processing device.

16 Claims, 13 Drawing Sheets

PROCESSOR AND METHOD

CROSS-REFERENCE TO RELATED APPLICATION

This application claims the benefit under 35 USC § 119(a) of Korean Patent Application No. 10-2015-0181076, filed on Dec. 17, 2015, in the Korean Intellectual Property Office, the disclosure of which is incorporated herein in its entirety by reference for all purposes.

BACKGROUND

1. Field

The present disclosure relates to a processor and method, and relates to a processor and method with a network-on-chip (NOC) system.

2. Description of Related Art

A system on chip (SOC) is an integrated circuit (IC) that integrates various hardware modules/devices such as a processor, a hardware accelerator, a memory, etc., into a single chip. An on-chip communication medium is typically used to transmit and receive data between the hardware devices. A network-on-chip (NOC) system is a technology of placing routers for relaying data transmission inside a chip to allow distributed data transmission within the chip and between such hardware devices.

SUMMARY

One or more embodiments include processor, the processor including a source processing device configured to identify data to request from another device, and a destination processing device configured to, in response to a request for the identified data from the source processing device using credit-based flow control, transmit the identified data to the source processing device using the credit-based flow control, where the source processing device includes a credit buffer used for the credit-based flow control, the credit buffer being allocable to include a cache region configured to cache the transmitted identified data received by the source processing device.

The source processing device may selectively set a write index value for the cache region to indicate which next entry of the cache region to store data next requested and received by the source processing device, based on a determination of whether the identified data is stored in the cache region.

The source processing device may further include a tag matcher configured to perform a tag matching determination between an address of the identified data and tags corresponding to data cached in the cache region, to determine whether the identified data is stored in the cache region.

When tag matching determination indicates a cache miss the source processing device may increase a current write index value for the cache region.

The source processing device may cache the transmitted identified data in the cache region based on the current write index value when the cache miss occurs and then perform the increasing of the current write index value to indicate where a next received data is to be cached in the cache region.

When data is cached in all entries of the credit buffer allocated to the cache region and there are available entries of the credit buffer that the write index value can be increased to represent, the source processing device may delete data cached in an initial entry of the cache region among the entries allocated in the cache region and transmit a credit grant to the destination processing device in accordance with the credit-based flow control.

With the deletion of the data cached in the initial entry of the cache region, the processor may further reallocate the cache region to no longer include the initial entry and to newly include an entry of the credit buffer corresponding to the increased current write value.

When data is cached in all entries of the credit buffer allocated to the cache region and the cache miss occurs while there are no available entries of the credit buffer that the write index value can be increased to represent, the source processing device may initialize the write index value to represent an initial entry of the credit buffer.

When the processor initializes the write index value, the processor may reallocate the cache region to include the initial entry of the of the credit buffer.

The source processing device may automatically transmit the request for the identified data and the source processing device may be further configured to include a tag matcher configured to perform a tag matching determination between tags corresponding to data cached in the cache region and the transmitted identified data received by the source processing device, to determine whether the identified data is stored in the cache region.

The source processing device may further include a request first-in first-out (FIFO) buffer configured to store a result of a tag matching determination between an address of the identified data and tags corresponding to data cached in the cache region, and a controller configured to perform control to read data cached in the cache region using a hit index, indicating which entry of the cache region includes the identified data, when the stored result of the tag matching determination is a cache hit, and to perform control to increase a current write index value for the cache region when the stored result of the tag matching determination is a cache miss.

When the cache miss occurs while data is cached in all entries of the credit buffer that are allocated to the cache region, the controller may perform control to transmit a credit grant to the destination processing device in accordance with the credit-based flow control.

At least one of the source processing device and the destination processing device may be a router or an intellectual property (IP) integrated in the processor.

The processor may transceive data between a plurality of devices, including the source processing device and the destination processing device, using a network-on-chip (NOC) system.

A location of the cache region in the credit buffer may be variable.

One or more embodiments include a method of processing data using a processor, the method including identifying, by a source processing device, data to request from another device, transmitting, by a destination processing device, the identified data to the source processing device in response to a request for the identified data from the source processing device using credit-based flow control, and caching, in a selectively allocated cache region of a credit buffer of the source processing device, the transmitted identified data as received by the source processing device.

The method may further include selectively allocating a cache region from all portions of the credit buffer.

The source processing device may selectively sets a write index value for the cache region to indicate which next entry of the cache region to store data next received by the source processing device, based on a determination of whether the identified data is stored in the cache region.

The method may further include performing a tag matching determination between an address of the identified data and tags corresponding to data cached in the cache region.

When the tag matching determination indicates a cache miss, the method may further include increasing a current write index value of the cache region.

The transmitting may include transmitting the identified data to the source processing device based on the tag matching determination indicating the cache miss, and the caching of the transmitted identified data may include caching the transmitted data as received by the source processing device in a select entry of the cache region corresponding to the current write index value and then performing the increasing of the current write index value.

The method may further include deleting data cached in an initial entry of the cache region when data is cached in all entries of the credit buffer that are allocated to the cache region, and transmitting a credit grant to the destination processing device, in accordance with the credit-based flow control, when the data cached in the initial entry is deleted.

When the cache miss occurs while there are no available entries of the credit buffer that the write index value can be increased to represent, the method may include initializing the write index value to represent an initial entry of the credit buffer and reallocating the cache region to include the initial entry.

The method may include storing a result of a tag matching determination between an address of the identified data and tags corresponding to data cached in the cache region, and performing control to read data cached in the cache region using a hit index, indicating which entry of the cache region includes the identified data, when the stored result of the tag matching determination is a cache hit or performing control to increase a current write index value for the cache region when the stored result of the tag matching determination is a cache miss.

One or more embodiments may include a processor, the processor including a first processing device including a first data processing device and a first credit buffer, the first data processing device being configured to perform a first processing of data, to store results of the first processing in the first credit buffer, and to identify first data to request from any of a plurality of processing devices, including a second processing device, and the second processing device including a second data processing device and a second credit buffer, the second data processing device being configured to perform a second processing of data, to store results of the second processing in the second credit buffer, and to identify second data to request from any of the plurality of processing devices, including the first processing device.

When the first processing device requests first data from the second processing device using credit-based flow control, the first processing device may use a selectively allocated first cache region of the first credit buffer to cache corresponding data received from the second credit buffer of the second processing device, and when the second processing device requests the second data from the first processing device using credit-based flow control, the second processing device may use a selectively allocated second cache region of the second credit buffer to cache corresponding data received from the first credit buffer of the first processing device.

When the first processing device uses the selectively allocated first cache region in the first credit buffer to cache the corresponding data received from the second credit buffer of the second processing device, the first data processing device of the first processing device may perform a processing operation using the cached corresponding data received from the second credit buffer of the second processing device, and, when the second processing device uses the selectively allocated second cache region in the second credit buffer to cache the corresponding data received from the first credit buffer of the first processing device, the second data processing device of the second processing device may perform a processing operation using the cached corresponding data received from the first credit buffer of the first processing device.

Additional aspects will be set forth in part in the description which follows and, in part, will be apparent from the description, or may be learned by practice of one or more of the presented embodiments.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
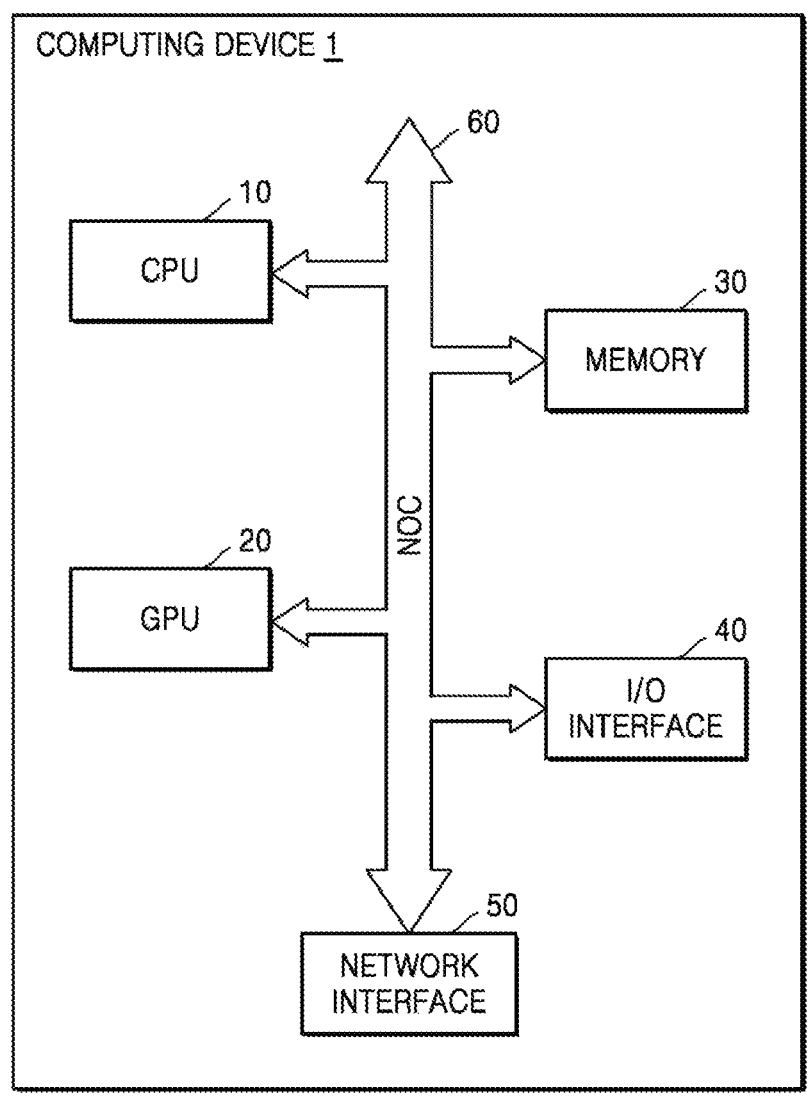
FIG. 1 is a diagram describing a computing device according to one or more embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

As used herein, the term "and/or" includes any and all combinations of one or more of the associated listed items. Expressions such as "at least one of," when preceding a list of elements, modify the entire list of elements and do not modify the individual elements of the list. In addition, terms used in the embodiments have been selected as general terms which may be widely used at present, in consideration of the example elements and operations of the embodiments, but may be altered according to the intent of an operator skilled in the art, conventional practice, or the introduction of new technology after a full understanding of the present disclosure. Also, if there is a term which is arbitrarily selected by the applicant in a specific case, in this case, a meaning of the term will be described in detail in a corresponding description portion of the embodiments. Therefore, the terms should be defined on the basis of the entire content of the embodiments instead of a simple name of each of the terms.

The use of the terms "a," "an," and "the" and similar referents in the context of describing aspects or elements of differing embodiments are to be construed to indicate that embodiments are available that include both singular and plural aspects or elements. Furthermore, recitation of ranges of values herein are merely intended to serve as a shorthand method of referring individually to each separate value falling within the range, unless otherwise indicated herein, and each separate value is incorporated into the specification as if it were individually recited herein.

In the following description of embodiments, when one part (i.e., hardware element, device, etc.) is referred to as being "connected" to another part (i.e., hardware element, device, etc.), it should be understood that the former may be "directly connected" to the latter, or "electrically connected" to the latter via intervening part(s) (i.e., intervening hardware element(s), device(s), etc.). Moreover, each of terms such as "unit", "module", and "device" described herein is defined as a hardware element, such as one or more processing devices or other corresponding hardware devices, configured so as to perform at least one operation.

The terms "comprising" and "including" used here in the Detailed Description should not be construed to imply that all of the respectively disclosed elements or operations are always included in all embodiments, but should be construed to indicate that some of the elements or operations may not be included in alternate embodiments, and/or that additional elements or operations may be included in the same or alternate embodiments.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

FIG. 1 is a diagram describing a computing device according to one or more embodiments.

Referring to FIG. 1, as an example, a computing device 1 includes a central processing unit (CPU) 10, a graphics processing unit (GPU) 20, a memory 30, an input/output (I/O) interface 40, a network interface 50, and a network-on-chip (NOC) 60. In FIG. 1, elements convenient for description of FIG. 1 are shown to be included in the computing device 1, though it is to be understood by those skilled in the art that other general-purpose elements may be included in addition, or alternatively, to the elements shown in FIG. 1.

Examples of the computing device 1 include, but are not limited to, a desktop computer, a notebook computer, a smartphone, a personal digital assistant (PDA), a mobile media player, a video game console, a television set-top box, a tablet device, an e-book reader, a wearable device, etc. That is, the computing device 1 is a device with a processing capability and may include various devices.

The CPU 10 and the GPU 20 are hardware components that process and perform various operations to be performed in the computing device 1.

The memory 30 is a hardware component that stores various types of data processed in, by, and resulting from the computing device 1. For example, the memory 30 may store data that has been processed, data that is to be processed, and data relied upon during such processing by the CPU 10 and the GPU 20. In addition, the memory 30 may store applications, drivers, and operating systems (OSs) to be run by the CPU 10 and the GPU 20. The memory 30, or other non-transitory media, may store processor readable code to control any of the processing device(s) to implement any of the methods or processes described herein. The memory 30 may include a random access memory (RAM), such as a dynamic random access memory (DRAM), a static random access memory (SRAM), etc., a read-only memory (ROM), an electrically erasable programmable read-only memory (EEPROM), a compact disc ROM (CD-ROM), a Blu-ray, other optical disk storages, a hard disk drive (HDD), a solid state drive (SSD), or a flash memory, and may further include another external non-transitory storage device that is accessible by the computing device 1.

The I/O interface 40 is a hardware component that receives input information of a user from devices, such as a keyboard, a mouse, etc., connected to the computing device 1 or that are provided in I/O interface 40, through which a user may input desired information, or that transmits processing information of the computing device 1 to a display device connected to or provided in the I/O interface 40 or the computing device 1 to display information processed by the computing device 1 on the display device.

The network interface 50 is a hardware component through which the computing device 1 may communicate with an external network in a wired and/or wireless manner, and may include various wired or wireless hardware communication modules/devices such as an Ethernet module, a Wi-Fi module, a Bluetooth module, a Near Field Communication (NFC) module, etc.

The NOC 60 is a hardware communication system, e.g., which may be embodied in/as a semiconductor chip, that connects hardware components in the computing device 1 to one another to transceive data between the hardware components. In other words, the NOC 60 may denote a technology that may process data by networking a plurality of intellectual properties (IPs) through one or more routers. Here, the IPs may correspond to one or more processor cores of a semiconductor chip, one or more hardware accelerators, one or more routers, etc, or any combination of the same. Furthermore, the IPs may denote a hardware unit of the processor, a predefined hardware unit of the memory, etc. In an embodiment, the IPs may also be separate hardware function elements of a reconfigurable processor of a semiconductor chip, or a system on a chip (SoC) semiconductor chip, and the NOC 60 may be integrated with the semiconductor chip with routers to share data between the function elements and/or local, global, or exterior memories. Thus, as only an example and for convenience of explanation, FIG. 1 demonstrates that data communication among the CPU 10, the GPU 20, the memory 30, the I/O interface 40, and the network interface 50 may be performed through the NOC 60.

Other than the data communication among the hardware components, hardware modules/devices inside some of these hardware components may perform internal or local data communication among such devices using the NOC. In the computing device 1, such devices or cores, as other hardware processing elements included in a processing device such as the CPU 10 and the GPU 20, may perform data communication using the NOC. The remaining hardware components in the computing device 1 other than the CPU 10 and the GPU 20 may also be implemented using the NOC. The number of hardware components implemented using the NOC in the computing device 1 may vary.

Figure 2:
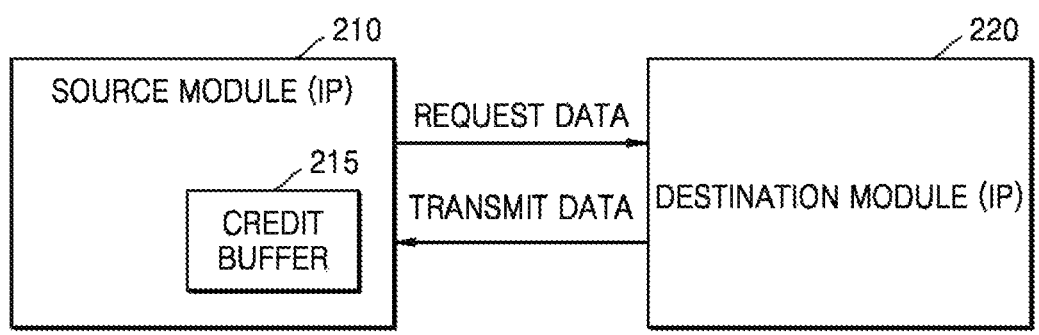
FIG. 2 is a diagram describing any two devices inside a processor according to one or more embodiments.

FIG. 2 is a diagram describing any two devices inside a processor according to an embodiment. According to embodiments, the processor may refer to the CPU 10 or the GPU 20 shown in FIG. 1, but is not limited thereto. For example, the processor may refer to a processing unit (e.g., a memory controller) included in the memory 30 or a processing unit included in the network interface 50. For example, a source device 210 will be described as an IP device of such a processor part that generates a data request, and a destination device 220 will be described as an IP device of such a processor part that transmits data to the source device 210 upon receiving the data request from the source device 210.

The source device 210 may store the received data from the destination device 220 in a credit buffer 215. Here, the storing of the received data in the credit buffer 215 may be done for various purposes such as data buffering or data caching.

Each of the source device 210 and the destination device 220 may correspond to a respective IP, such as a processor core, a hardware accelerator, and a router, in a particular processor, for example. For convenience of explanation, discussions below with regard to FIGS. 3-13 may refer to such source devices 210, destination devices 220, and credit buffers 215 of FIG. 2, though it should be understood that such respective embodiments are not limited to the same. For example, it should be understood that such respective embodiments may include additional and/or alternative components or other general-purpose elements for the same.

Figure 3:
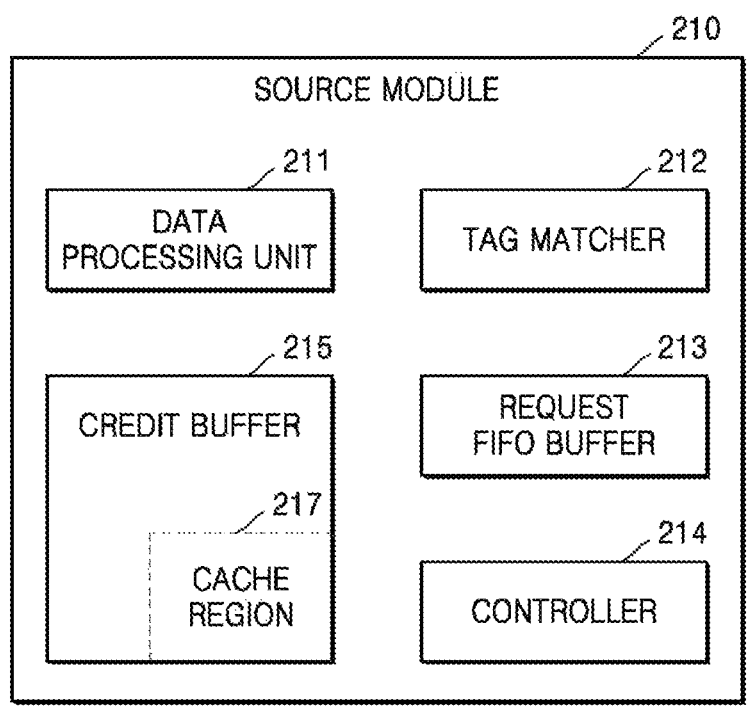
FIG. 3 is a block diagram of a source device according to one or more embodiments.

FIG. 3 is a block diagram of a source device according to one or more embodiments.

Referring to FIG. 3, a source device 210 may include a data processing unit 211, a credit buffer 215, a tag matcher 212, a request first-in first-out (FIFO) buffer 213, and a controller 214, for example. For convenience of explanation, discussions below with regard to FIGS. 4-13 may refer to any of the data processing unit 211, credit buffer 215, tag matcher 212, request FIFO buffer 213, and controller 214 of FIG. 3, though it should be understood that such respective embodiments are not limited to the same. For example, it should be understood that such respective embodiments may include additional and/or alternative components or other general-purpose elements for the same.

The data processing unit 211 identifies data to be processed and generates a request for the identified data to be processed. The data to be processed may be data that is needed by or for the data processing unit 211 to perform one or more particular or general operations. The data request may be of various types such as an address data request type from which the data is to be read or a signature data request type of the data, as only examples.

The credit buffer 215 may buffer data that has been processed by the data processing unit 211 or data to be processed by the data processing unit 211, for example. Furthermore, a cache region 217 for data caching may be a set/allocated portion of the credit buffer 215. The cache region 217 may be a dynamically allocated region of the credit buffer 215, e.g., dependent on other uses of the credit buffer 215 or desire for additional or less cache entries of the cache region 217. For example, the credit buffer 215 may have N available entries, and K entries of those N available entries may be allocated as the cache region 217. The cache region 217, allocated/implemented within the credit buffer 215, may be used as a region that performs a role similar to a roll performed by an external cache. That is, in an embodiment, with the cache region 217, the source device 210 may not include or use an independent cache separate from the credit buffer 215 or external from the source device 210 to store received data from a destination device 220. By allocating the cache region 217 that performs a similar role to a cache within the credit buffer 215, the data processing unit 211 may enable faster data access than if such a separate cache were used. For example, if the source device 210 only has a cache implemented independently from the credit buffer 215, the credit buffer 215 may simply store data and perform only a role of copying data needed by the data processing unit 211 into the cache. However, with such a cache implemented independently from the credit buffer 215, there is a large amount of traffic between the credit buffer 215 and the independent cache that results in unnecessary bandwidth being consumed, which wastes buffer energy. Rather, according to one or more embodiments, when the cache region 217, having a similar role to such an external cache, is implemented using the credit buffer 215, data traffic between the credit buffer 215 and the cached data is reduced, meaning bandwidths may not be unnecessarily wasted compared to bandwidth waste that occurs when the cache is independent of the credit buffer 215 or of the source device 210.

The tag matcher 212 performs tag matching between an address of data to be requested and a tag corresponding to data cached in the cache region 217. When the data is cached in the cache region 217, a tag for identifying a data address, e.g., as stored in the destination device 220, may also be mapped to the already cached data in the cache region 217. Thus, the tag matcher 212 may use the tag to identify whether data to be requested is already cached in the cache region 217.

When a result of the tag matching is that the data to be requested is determined to be cached in the cache region 217, the tag matcher 212 determines or indicates a cache hit. When a result of the tag matching is that the data to be requested is determined to not be cached in the cache region 217, the tag matcher 212 determines or indicates a cache miss.

A request FIFO buffer 213 stores the result of the tag matching. That is, the request FIFO buffer 213 may store a respective hit index or hit flag indicating a corresponding hit entry in the cache region 217 when the cache hit is determined, and the request FIFO buffer 213 may store a miss flag when the cache miss is determined.

According to a result of the tag matching of the tag matcher 212, e.g., depending on the stored hit or miss indicator in the FIFO buffer 213, the controller 214 controls data read/write operations with/in the cache region 217 of the credit buffer 215. More particularly, the controller 214 performs control to read data cached in an entry of the cache region 217 when the result of the tag matching stored in the request FIFO buffer 213 is the cache hit, e.g., in the entry of the cache region 217 identified by the hit index stored in the FIFO buffer 213. The controller 214 performs control to increase a write index value of the cache region 217 when the stored result of the tag matching is the cache miss. According to one or more embodiments, when new data is to be cached in the cache region 217, the write index is information used to indicate which entry of the cache region 217 received data should be written in/to. For example, the write index value may have a value that corresponds to a particular entry of the credit buffer 215 or more particularly of the cache region 217 allocated in the credit buffer 215. Furthermore, the controller 214 may control the transmission of a credit grant to the destination device 220.

As described above, in one or more embodiments, the source device 210 includes the credit buffer 215 in order to transceive data with another device (e.g., the destination device 220) using a credit-based flow control. In such embodiments, it has been described that the credit-based flow control using the credit buffer 215 is performed in a processor implemented using the NOC, but is not limited thereto. As long as such a credit-based flow control is performed using such a credit buffer 215, such embodiments may also be applied to a processor implemented without the use of the NOC.

Figure 4:
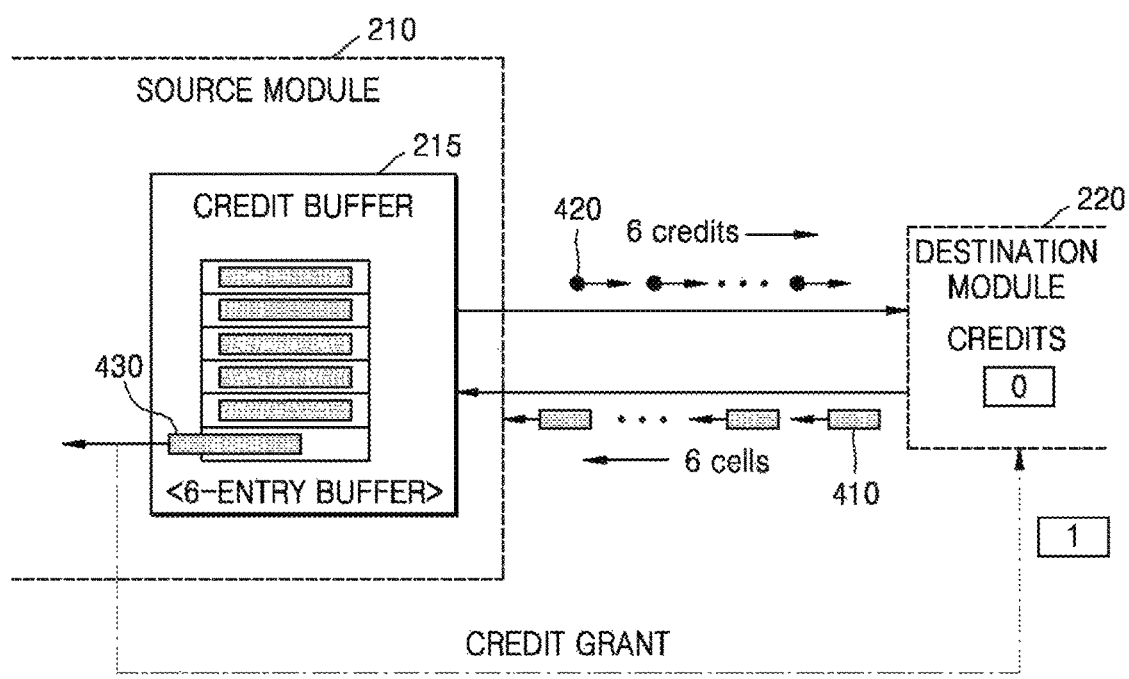
FIG. 4 is a diagram describing credit-based flow control performed between a source device and a destination device according to one or more embodiments.

FIG. 4 is a diagram describing credit-based flow control performed between a source device and a destination device according to one or more embodiments.

Referring to FIG. 4, when a source device 210 requests data from a destination device 220, the destination device 220 transmits the requested data to the source device 210. The source device 210 may store data received from the destination device 220 in a credit buffer 215. Here, as only an example, it is assumed that the credit buffer 215 is a 6-entry buffer having a total of 6 entries.

The destination device 220 is aware in advance, or made aware, of information on a credit count for the credit buffer 215 of the source device 210. The credit count for the credit buffer 215 is information on entries that may be stored in the credit buffer 215. Since the credit buffer 215 is a 6-entry buffer, a first credit count may be 6 in FIG. 4.

According to the credit based flow control, when the source device 210 requests data from the destination device 220, the destination device 220 may transmit data packets 410 of 6 cells. Whenever each of the data packets is received, the source device 210 returns a credit 420, indicating that the requested data has been stored in the credit buffer 215, to the destination device 220. That is, the source device 210 may return a total of 6 credits 420 to the destination device. Whenever the credit 420 is received from the source device 210, the destination device 220 decreases the credit count by 1. As credits 420 are continuously received and the credit count for the source device becomes zero, the destination device 220 may determine that the credit buffer 215 is full and can no longer receive data. Here, the destination device 220 may include a memory or register that stores and increments such a credit count for at least the source device based on such received credits and according to the credit based flow control, which may control when, whether, and/or how many data are transmitted to the source device 210.

When any data 430 is read from the credit buffer 215 and the processing of the data 430 is completed, the data 430 may be deleted from the credit buffer 215. In this case, the credit buffer 215 transmits a credit grant to the destination device 220 in order to inform the destination device 220 that an entry is vacant. Whenever the destination device 220 receives a credit grant, the destination device 220 increases the credit count by 1. For example, in an embodiment, if the credit count by the destination device 220 is greater than zero the destination device 220 may transmit a requested data, while when the credit count is zero the destination device 220 may buffer or wait to transmit requested data.

According to the above-described credit-based flow control, the source device 210 and the destination device 220 may transmit and receive data.

Figure 5:
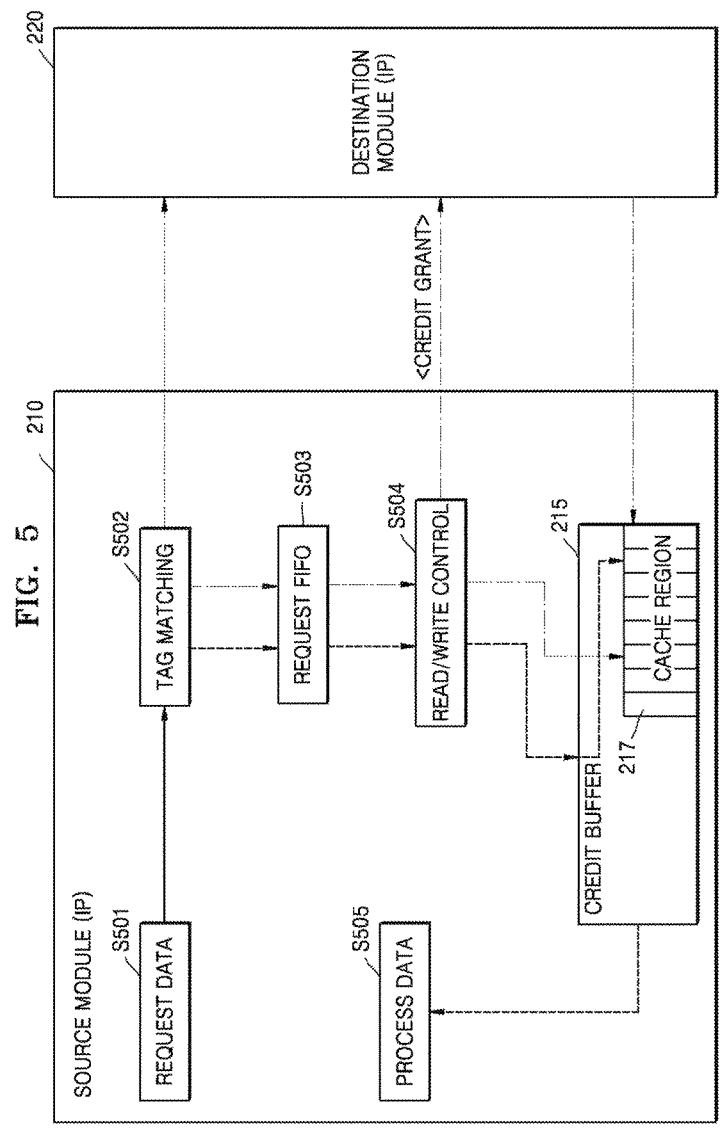
FIG. 5 is a diagram describing data communication between a source device and a destination device using credit-based flow control according to one or more embodiments.

FIG. 5 is a diagram describing data communication between a source device and a destination device using credit-based flow control according to one or more embodiments.

Referring to FIG. 5, a credit buffer 215 of a source device 210 allocates some entries of the credit buffer 215 to be the cache region 217. The location of the cache region 217 of the credit buffer 215 is variable. The source device 210 may cache data received from a destination device 220 in the cache region 217 of the credit buffer 215.

In S501, a data processing unit 211 identifies and generates a request for data. For example, the data processing unit 211 may generate a request for data by designating an address of the data. In an embodiment, though potentially generated, the request for the identified data may not be transmitted to the destination device 220 when there is a cache hit in S502 below. In another embodiment, the request for the identified data may be automatically transmitted to the destination device 220, such as discussed in greater detail below with respect to FIG. 12, for example.

In S502, a tag matcher 212 performs tag matching between the address of the data to be requested and tags corresponding to data cached in the cache region 217. When a result of the tag matching is that the data to be requested is cached in the cache region 217, the tag matcher 212 determines a cache hit. When a result of the tag matching is that the data to be requested is not cached in the cache region 217, the tag matcher 212 determines a cache miss.

In S503, a request FIFO buffer 213 stores a result of the tag matching between the address of the identified data and one or more tags corresponding to data cached in the cache region 217. The request FIFO buffer 213 may store a hit index or a hit flag indicating a hit entry in the cache region 217 when the cache hit is determined, and may store a miss flag when the cache miss is determined.

In FIG. 5, the arrows with dashed lines indicate operations corresponding to the cache hit, and arrows with alternating long and short dashed lines indicate operations corresponding to the cache miss.

In S504, when the result of the tag matching stored in the request FIFO buffer 213 is the cache hit, the controller 214 performs control to read data cached in the cache region 217 using the hit index.

In S505, the data processing unit 211 processes the data read from the cache region 217. That is, when the cache hit is determined, the data request by the data processing unit 211 is not transmitted or not delivered to the destination device 220, but processed within the source device 210.

Returning to S502, when the result of the tag matching of the tag matcher 212 is the cache miss, the data request (e.g., a generated request for an identified address of the data) of the data processing unit 211 is transmitted to the destination device 220.

In S504, when the result of the tag matching stored in the request FIFO buffer 213 is the cache miss, the controller 214 caches the data received from the destination device 220 to an entry corresponding to a current write index value. Then, the controller 214 may set a new write index by increasing the write index value of the cache region 217. That is, the source device 210 may set the write index value of the cache region 217 on the basis of whether the data to be requested and the cached data match each other.

Whenever data cached in any entry is deleted from the cache region 217, the controller 214 may transmit a credit grant to the destination device 220.

As described above, when data communication using the credit-based flow control is performed between the source device 210 and the destination device 220, the data processing unit 211 may perform fast data processing without a separate cache by utilizing the data cached in the cache region 217 of the credit buffer 215 to perform data access.

Here, it is noted that though the above example discussion of FIGS. 2-5 may have focused on respective examples of credit-based flow control with respect to data that may be requested by a data processing element of the source device 210 and selective request/transmission of that requested data to the source device 210 by the destination device 220, it is noted that the destination device 220 may have a similar arrangement as the discussed arrangement of the source device 210 in FIG. 3, for example, and may operate similarly to the discussions regarding FIGS. 2-5 for data requested by the destination device 220 that may be selectively provided to the destination device 220 by the source device 210. Thus, FIG. 3 should also be considered as representative of the configuration of the destination device, as only an example, which may operate similarly to the discussions of FIGS. 2-5. In addition, the discussions below are similarly applicable to operations of the destination device 220 that includes a credit buffer with an allocated cache region that caches data requested from other devices according to the credit-based flow control according to one or more embodiments.

A method of utilizing the cache region 217 of the credit buffer 215 will be described in more detail with reference to FIGS. 6 to 10.

Figure 6:
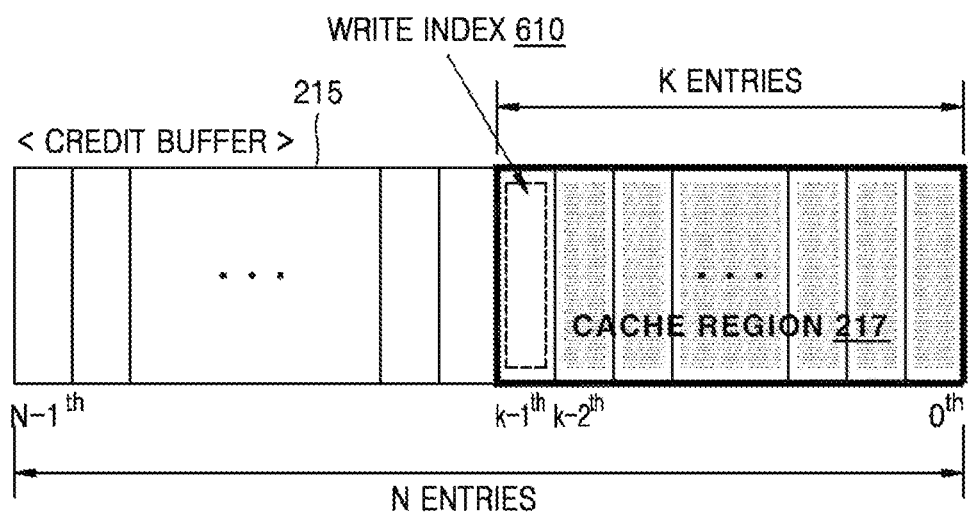
FIG. 6 is a diagram describing an allocation of a cache region in a credit buffer according to one or more embodiments.

FIG. 6 is a diagram describing an allocation of a cache region in a credit buffer according to one or more embodiments.

Referring to FIG. 6, it is assumed that a credit buffer 215 has a total of N entries (here, N is a natural number). That is, the credit buffer 215 may store data from a $0^{th}$ entry to a $(N-1)^{th}$ entry.

Some of the total of N entries of the credit buffer 215 may be allocated as a cache region 217. For example, it is assumed that K entries (here, K is a natural number smaller than N) are allocated as the cache region 217. Upon a first allocation of the cache region 217, the $0^{th}$ entry to a $(K-1)^{th}$ entry may be allocated as the cache region 217, but are not limited thereto. An initial start entry of the cache region 217 may not be the $0^{th}$ entry, but rather this is only an example.

A write index 610 points to an entry after an entry in which the writing of data is completed. As shown in FIG. 6, when all data is written from the $0^{th}$ entry to a $(K-2)^{th}$ entry in the cache region 217, the write index 610 may have a write index value that indicates the $(K-1)^{th}$ entry. As only an example, the corresponding write index value may be stored in another entry of the credit buffer 215, such as outside of the allocated cache region 217 or another memory of the source device 210.

As described above, a source device 210 according to the embodiment may perform data caching without a separate cache, i.e., outside the credit buffer 215 or outside of the source device 210, by allocating the cache region 217 within the credit buffer 215.

Figure 7:
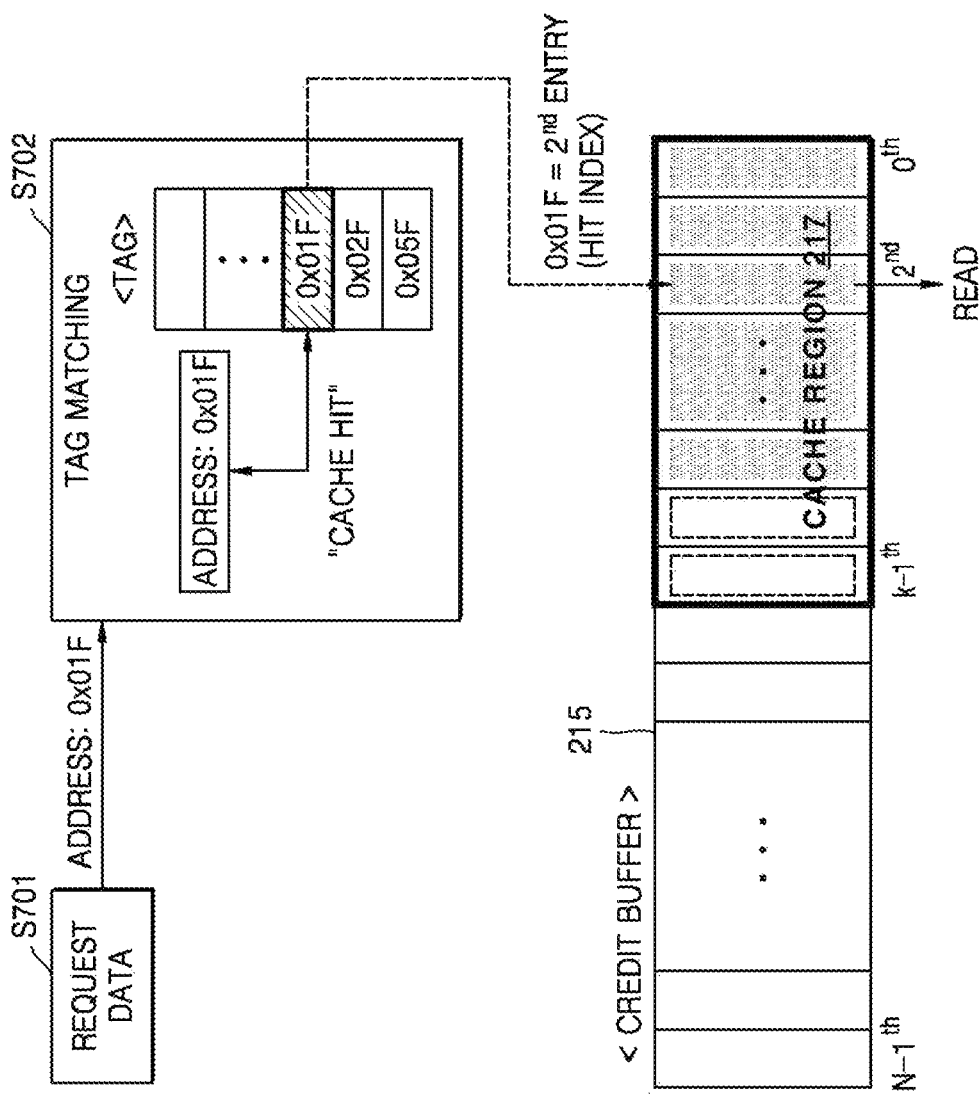
FIG. 7 is a diagram describing data access in a cache region in case of a cache hit according to one or more embodiments.

FIG. 7 is a diagram describing data access in a cache region in case of a cache hit according to one or more embodiments.

Referring to FIG. 7, a data processing unit 211 may generate a data request in S701 of a specific address (e.g., 0x01F). A tag matcher 212 performs tag matching in S702 for determining whether there is a tag matching the address 0x01F of the requested data. When there is a tag that matches the address 0x01F, the tag matcher 212 determines a cache hit. Thus, a hit index may indicate that the tag 0x01F designates or corresponds to a second entry in the cache region 217. That is, for the cache hit, the hit index is information indicating which entry in the cache region 217 corresponds to the matching tag. The entry in the cache region 217 corresponding to the tag is the cached data of the address 0x01F. The controller 214 reads the data of the address 0x01F that is cached in the second entry in the cache region 217.

That is, as described in FIG. 7, with a portion of the credit buffer 215 being allocated to act as the cache region 217, e.g., by allocating the cache region 217 within the credit buffer 215 of the source device 210, faster data access may be enabled compared to if a separate cache external to the credit buffer 215 or the source device 210 was used as the cache to store received data from a destination device 220.

Figure 8:
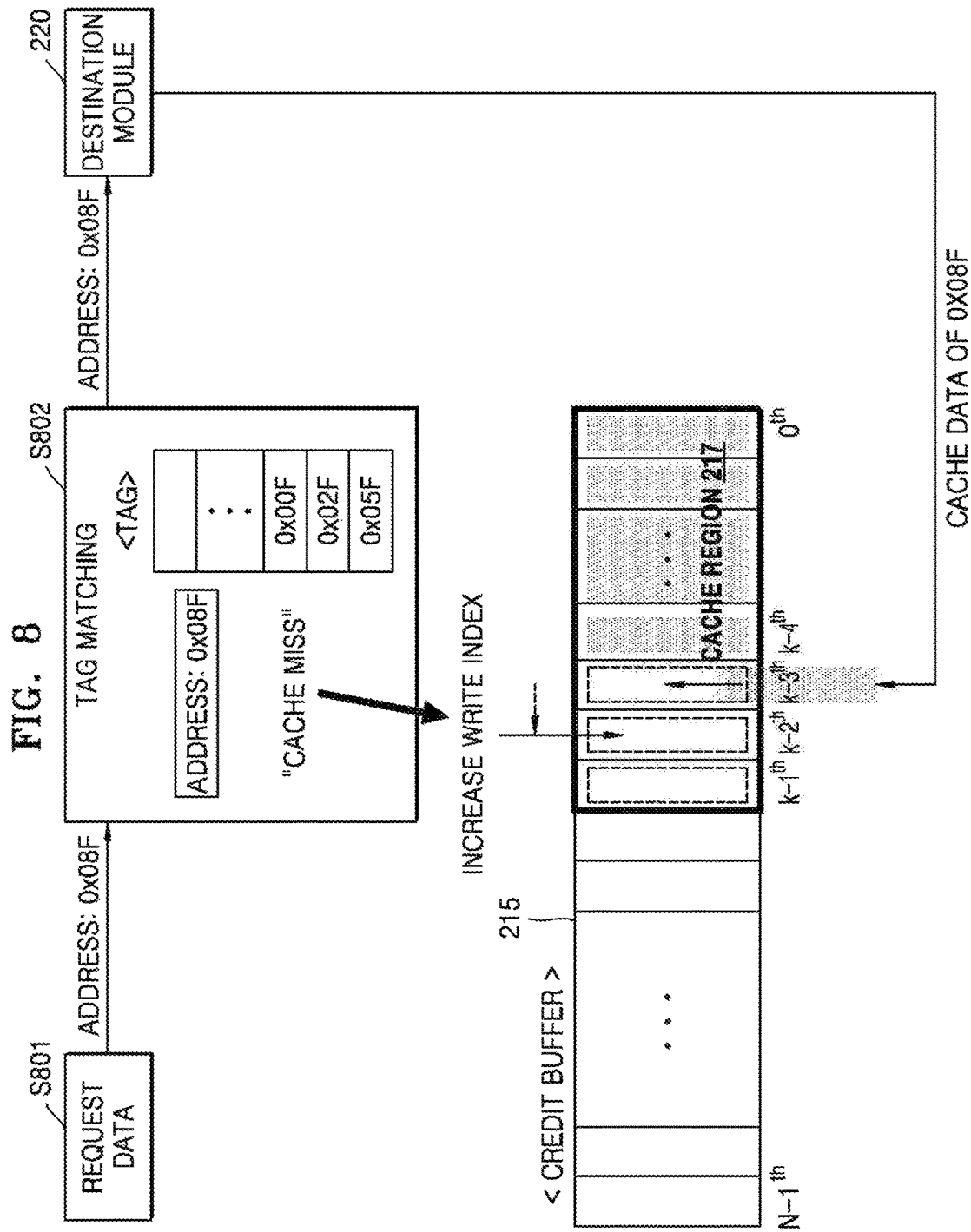
FIG. 8 is a diagram describing data caching in a cache region in case of a cache miss according to one or more embodiments.

FIG. 8 is a diagram describing data caching in a cache region in case of a cache miss according to one or more embodiments.

Referring to FIG. 8, a data processing unit 211 of a source device 210 may generate a data request in S801 of a specific address (e.g., 0x08F). A tag matcher 212 performs tag matching in S802 for determining whether there is a tag matching the address 0x08F of the requested data. Since there is not a tag that matches the address 0x08F, the tag matcher 212 determines a cache miss. Thus, a destination device 220 may be provided or receive a request for data of the address 0x08F from the source device 210.

When the data of the address 0x08F is received from the destination device 220, the data of the address 0x08F is cached in an entry corresponding to, or based on, a current write index value of a cache region 217 of a credit buffer 215. In FIG. 8, since data has already been cached in the $0^{th}$ entry to the $(K-4)^{th}$ entry, the current write index value (i.e., a write index value before an increase of the write index) may correspond to, or indicate, the $(K-3)^{th}$ entry. Accordingly, the received data of the address 0x08F is cached in the $(K-3)^{th}$ entry of the cache region 217 based on the current write index value.

Since data can no longer be cached in the $(K-3)^{th}$ entry corresponding to the current write index value, a controller 214 increases or changes the write index to set a new write index value for a next available entry of the cache region 217, such as by setting the new write index value to the $(K-2)^{th}$ entry.

In other words, the source device 210 (e.g., the controller 214 of the source device 210) may set the write index value of the cache region 217 on the basis of whether the data to be requested and the cached data match each other. When the cache miss occurs, the source device 210 (e.g., the controller 214) increases the write index value of the cache region 217 to indicate where next received data corresponding to the next requested data should then be stored in the cache region 217.

Figure 9:
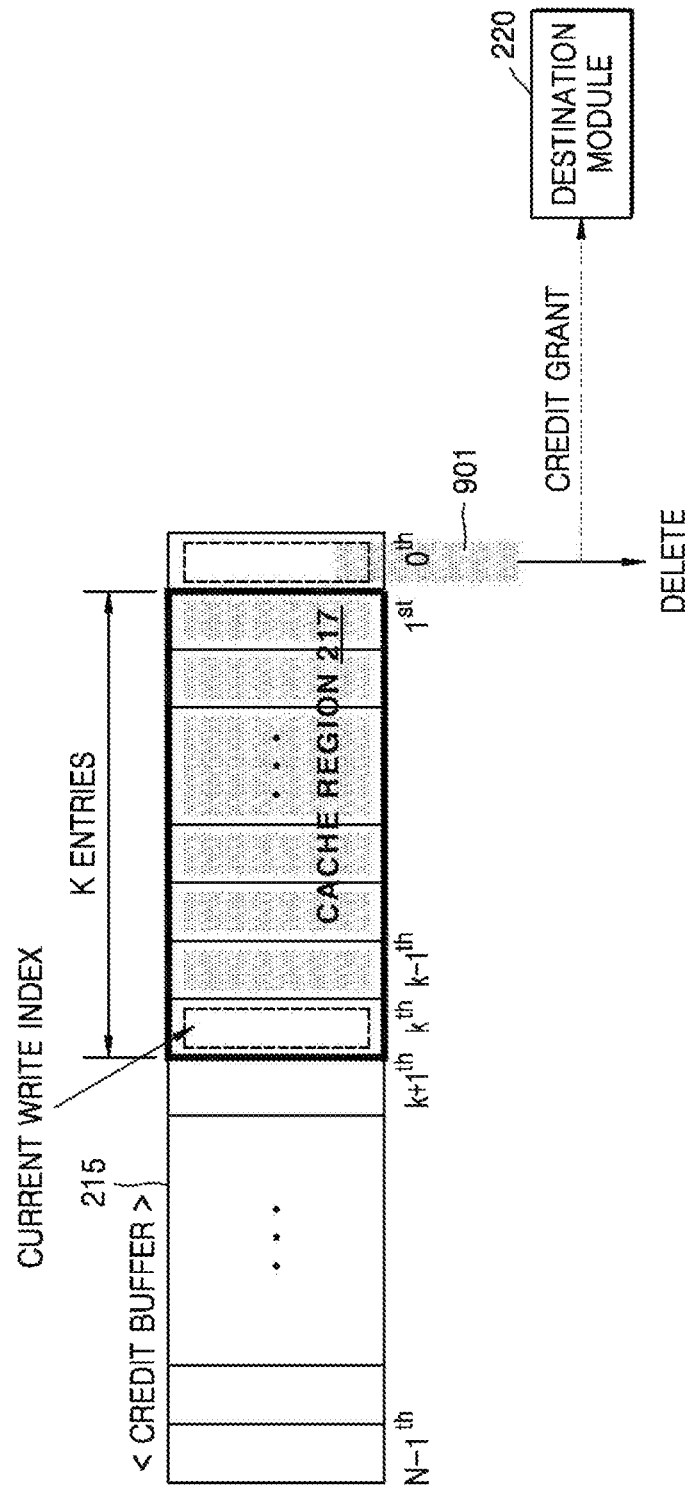
FIG. 9 is a diagram describing data caching in a cache region in case of a cache miss according to one or more embodiments.

FIG. 9 is a diagram describing data caching in a cache region in case of a cache miss according to one or more embodiments.

A case in which data is cached in all entries (i.e., a $0^{th}$ entry to a $(K-1)^{th}$ entry) of the cache region 217 described above in FIG. 8 will be described below with reference to FIG. 9.

Available entries allocated as the cache region 217 of the credit buffer 215 may be fixed to a total of K entries. When data has been cached in all of the K entries (i.e., the $0^{th}$ entry to the $(K-1)^{th}$ entry), a write index value could be set or increased to correspond to a $K^{th}$ entry, but the $K^{th}$ entry corresponds to the outside of the cache region 217, e.g., an increased index value would thus represent another of the N entries of the credit buffer 215 outside of the currently allocated cache region 217 of the credit buffer 215. Since such a write index value corresponds to an entry that is the outside of the cache region 217, a new allocation for the cache region 217 may be performed. This is because a next data received from the destination device 220 may desirably be cached in the cache region 217 but all of the $0^{th}$ entry through $(K-1)^{th}$ entry of the currently allocated cache region 217 are full. Accordingly, in an embodiment, data 901 cached in a first entry (e.g., the $0^{th}$ entry) among the K entries allocated as the cache region 217 may be deleted, and thus, the first entry to the $K^{th}$ entry of the credit buffer 215 may be newly allocated, i.e., reallocated, as the cache region 217 of the credit buffer 215.

Here, since the $K^{th}$ entry is empty in this example, and a new allocation for the cache region 217 has been performed, the cache region 217 has a spare entry to be cached, and thus a credit grant may be transmitted to the destination device 220.

Figure 10:
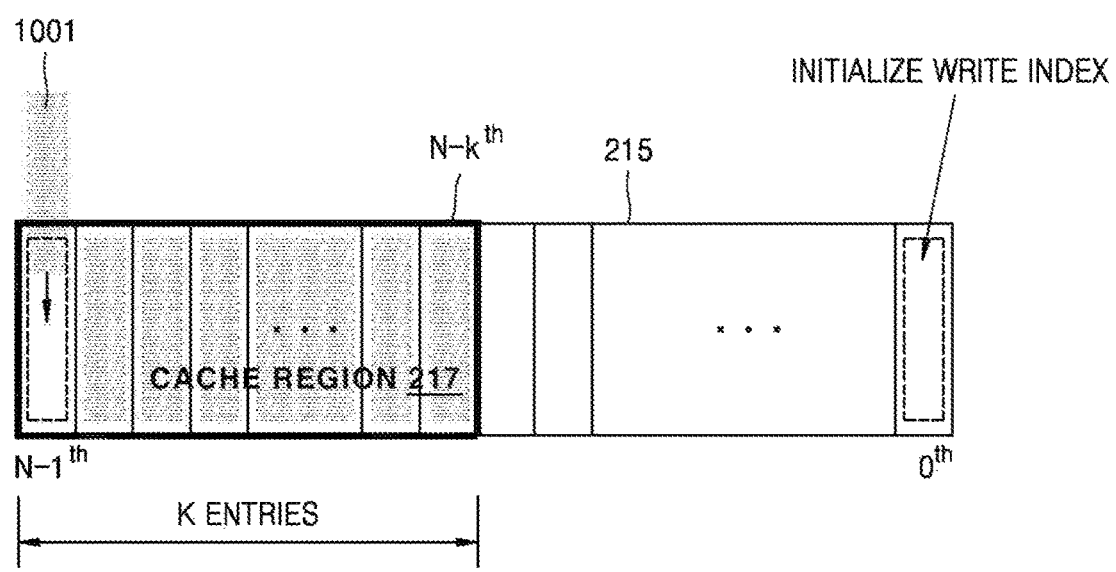
FIG. 10 is a diagram describing data caching in a cache region in case of a cache miss according to one or more embodiments.

FIG. 10 is a diagram describing data caching in a cache region in case of a cache miss according to one or more embodiments.

Similar to the discussion regarding FIG. 9, when a write index value is continuously (incrementally) increased or changes, as more data is cached in the cache region 217 the current write index value may eventually correspond to a final entry (i.e., a $(N-1)^{th}$ entry) of the credit buffer 215. In this example, the cache region 217 may be allocated a total of K example available entries N-1 through N-K, where N is greater than K and N is the total number of entries in the credit buffer 215.

When a cache miss occurs while the current write index value corresponds to the final entry (i.e., the $(N-1)^{th}$ entry) of the credit buffer 215, i.e., after the write index value has been increased or set based upon the cache miss, data 1001 received from a destination device 220 is cached in the $(N-1)^{th}$ entry according to the current write index value. Since the data 1001 is cached in an entry corresponding to the current write index value, the current write index value should be increased or set to a new write index value for a next caching of next received data. However, the $(N-1)^{th}$ entry corresponds to the final entry of the credit buffer 215, and thus it may be impossible to increase the write index value. Therefore, the write index value may be initialized or reset. The initialized write index value will now correspond to an initial entry (i.e., a $0^{th}$ entry) among the N entries allocable as the cache region 217 of the credit buffer 215.

That is, when it is impossible to increase the write index value, or there are no further entries of the credit buffer 215 available beyond the final entry of the cache region 217, the $0^{th}$ entry of the credit buffer 215 and the $(N-K)^{th}$ entry through the $(N-1)^{th}$ entry of the credit buffer 215 are newly allocated as the cache region 217. With this example, the reallocated cache region 217 may now have a total of K+1 available entries. Alternatively, and only as an example, if K is kept constant, the $(N-K)^{th}$ entry of the credit buffer 215 (e.g., corresponding to the initial entry of the current cache region 217) may be deleted and the $0^{th}$ entry of the credit buffer 215 and the $(N-K+1)^{th}$ entry through the $(N-1)^{th}$ entry of the credit buffer 215 may be newly allocated, i.e., reallocated, as the cache region 217. In addition, as demonstrated with these examples of FIG. 10, the cache region 217 may include non-contiguous entries of the credit buffer 215, or alternatively the entries of the credit region 217 may all be contiguous except for such a wrap-around example of using the first entry of the credit buffer 215 for the cache region 217 discussed above.

Figure 11:
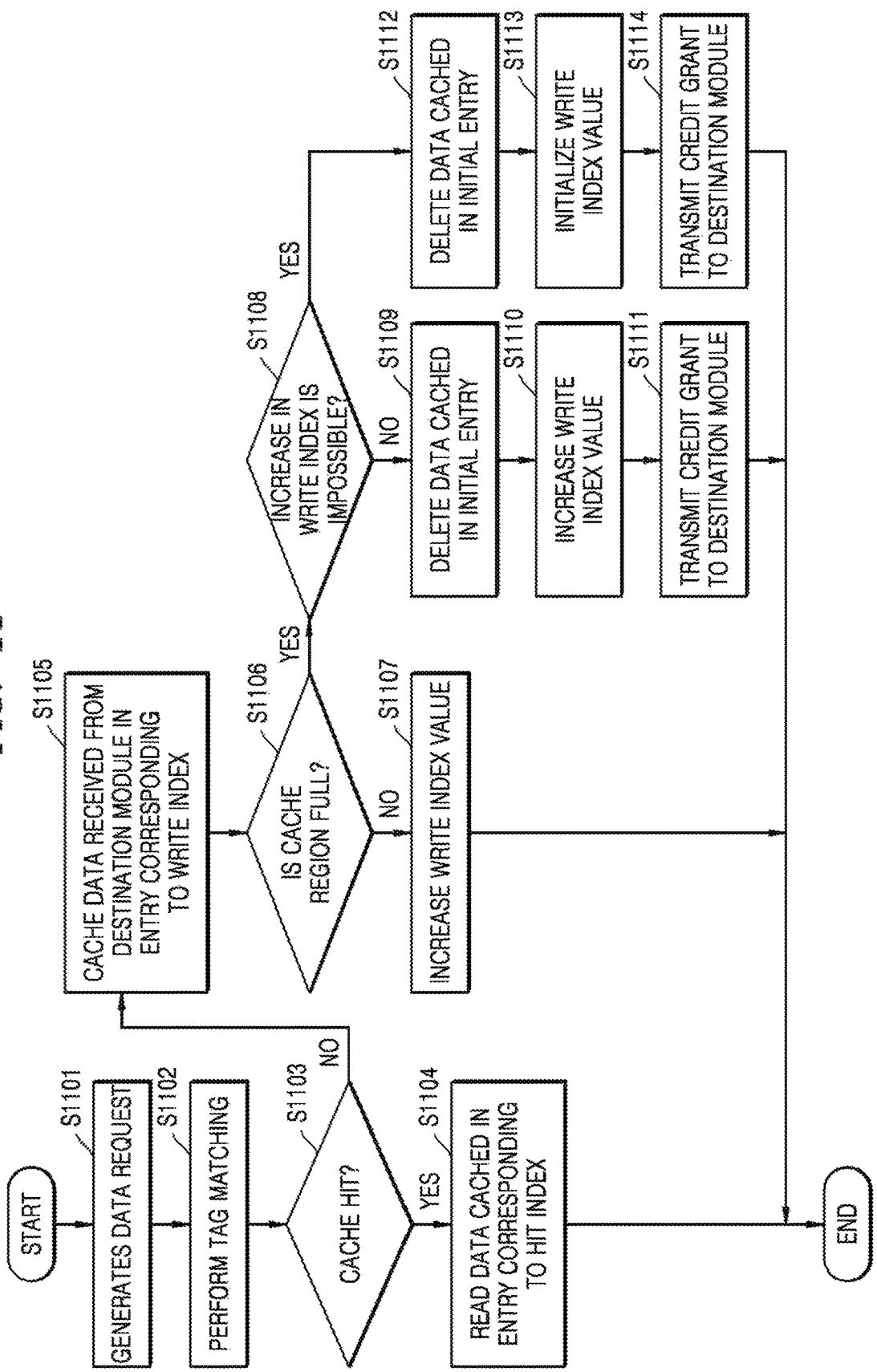
FIG. 11 is a detailed flowchart of a method of caching data using a cache region in a credit buffer of a source device according to one or more embodiments.

FIG. 11 is a detailed flowchart of a method of caching data using a cache region in a credit buffer of a source device according to one or more embodiments.

In S1101, a data processing unit 211 identifies and generates a data request.

In S1102, a tag matcher 212 performs tag matching between an address of the data to be requested and a tag of/for corresponding data cached in a cache region 217.

In S1103, the tag matcher 212 determines a cache hit or a cache miss depending on a result of the tag matching.

In S1104, when the cache hit is determined, a controller 214 controls a credit buffer 215 (i.e., from the cache region 217) to read out data cached in an entry corresponding to a hit index.

In S1105, when the cache miss is determined, the destination device 220 receives a request for the data based on the address, and the controller 214 caches the corresponding data received from the destination device 220 in an entry of the cache region 217 corresponding to a current write index.

In S1106, the controller 214 determines whether the cache region 217 is thereby made full by caching the data in the entry corresponding to the current write index.

In S1107, when the cache region 217 is not full after the caching of the data in the entry corresponding to the current write index, the controller 214 increases a corresponding write index value.

In S1108, when the cache region 217 is full, the controller 214 determines whether an increase in the write index value is available.

In S1109, when the increase in the write index value is allowed or available, the controller 214 controls the credit buffer 215 (i.e., the cache region 217 of the credit buffer 215) to delete data cached in an initial entry in the cache region 217. The cache region 217 may be reallocated to include the entry of the credit buffer 215 that corresponds to the increased write index value.

In S1110, the controller 214 increases the write index value.

In S1111, the controller 214 performs control to transmit a credit grant to the destination device 220.

In S1112, when the increase in the write index value is not allowed or available, the controller 214 controls the credit buffer 215 (i.e., the cache region 217 of the credit buffer 215) to delete data cached in an initial entry in the credit buffer 215 and the cache region 217 may be reallocated to include the initial entry of the credit buffer 215.

In S1113, the controller 214 initializes the write index value, e.g., setting the write index value to an initial value representing the initial entry of the credit buffer 215 that is now allocated to the cache region 217.

In S1114, the controller 214 performs control to transmit a credit grant to the destination device 220.

Figure 12:
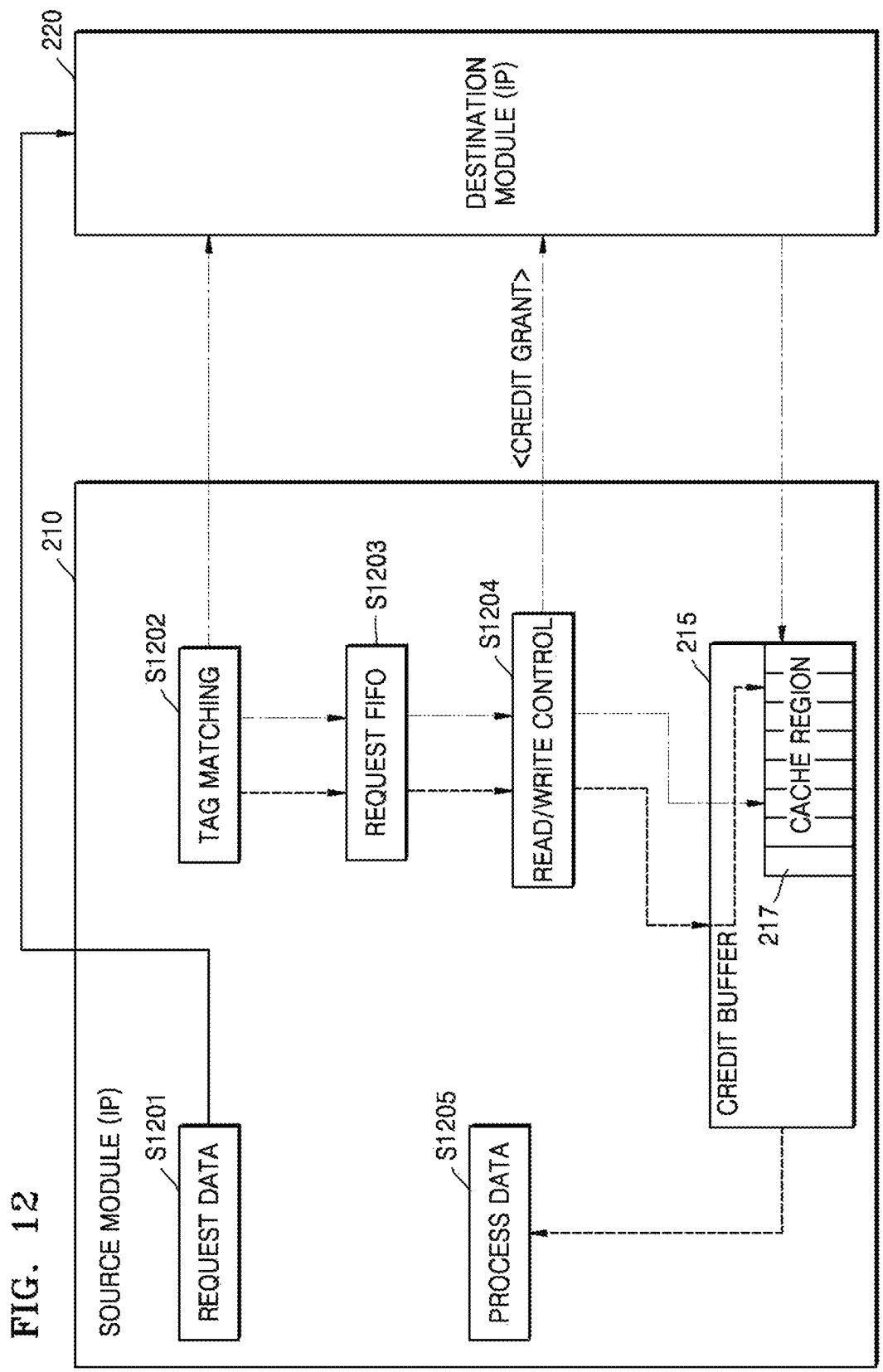
FIG. 12 is a diagram describing data communication between a source device and a destination device using credit-based flow control according to one or more embodiments.

FIG. 12 is a diagram describing data communication between a source device and a destination device using credit-based flow control according to one or more embodiments.

Referring to FIG. 12, unlike in FIG. 5, a data request is directly transmitted to a destination device 220, and tag matching is performed on data received from the destination device 220.

A credit buffer 215 of a source device 210 allocates some entries of the credit buffer 215 to the cache region 217. The source device 210 may cache data received from the destination device 220 in the cache region 217 of the credit buffer 215.

In S1201, a data processing unit 211 generates a data request. For example, the data processing unit 211 may identify and generate the data request by designating an address of the data.

The data request (a data address) is directly transmitted to the destination device 220. When the destination device 220 receives the data request, the destination device 220 transmits data of a corresponding address to the source device 210.

In S1202, a tag matcher 212 performs tag matching between an address of the received data and one or more tags corresponding to data cached in the cache region 217. When a result of the tag matching is that the received data is cached in the cache region 217, the tag matcher 212 determines a cache hit. When a result of the tag matching is that the received data is not cached in the cache region 217, the tag matcher 212 determines a cache miss.

In S1203, a request FIFO buffer 213 stores a result of the tag matching, such as by storing to the FIFO buffer 213 a hit index or a hit flag indicating a hit entry in the cache region 217 when the cache hit is determined and storing to the FIFO buffer 213 a miss flag when the cache miss is determined.

In FIG. 12, arrows with dashed lines indicate operations corresponding to the cache hit, and arrows with alternate long and short dash lines indicate operations corresponding to the cache miss.

In S1204, when the result of the tag matching stored in the request FIFO buffer 213 is the cache hit, a controller 214 performs control to read the data cached in the cache region 217 according to a corresponding hit index.

In S1205, the data processing unit 211 processes the data read from the cache region 217. That is, unlike in FIG. 5, although the data request is transmitted to the destination device 220, and the data is received from the destination device 220, the data is read from the cache region 217 when the cache hit is determined like FIG. 5. That is, since there is matching data that has already been cached, the data received from the destination device 220 according to the data request is not processed. This may be because the data processing unit 211 may access the cached data from the credit buffer 215 faster and more efficiently than if the data processing unit 211 accessed the currently received data.

In S1204, when the result of the tag matching stored in the request FIFO buffer 213 is the cache miss, the controller 214 caches the data received from the destination device 220 in an entry corresponding to a current write index value. Then, the controller 214 may set a new write index by increasing the write index value of the cache region 217. That is, the source device 210 may set the write index value of the cache region 217 on the basis of whether the received data and the cached data match each other. Then, in an embodiment, in S1205 the data processing unit 211 of the source device 210 may process the received data cached in the cache region 217.

Whenever data cached in any entry is deleted from the cache region 217, the controller 214 may transmit a credit grant to the destination device 220.

According to an embodiment, like the embodiment shown in FIG. 5, when data communication using the credit-based flow control is performed between the source device 210 and the destination device 220, the data processing unit 211 may perform fast data processing without a separate cache outside of the source device 210 or outside of the credit buffer 215 by utilizing the data cached in the cache region 217 of the credit buffer 215 to perform data access.

Figure 13:
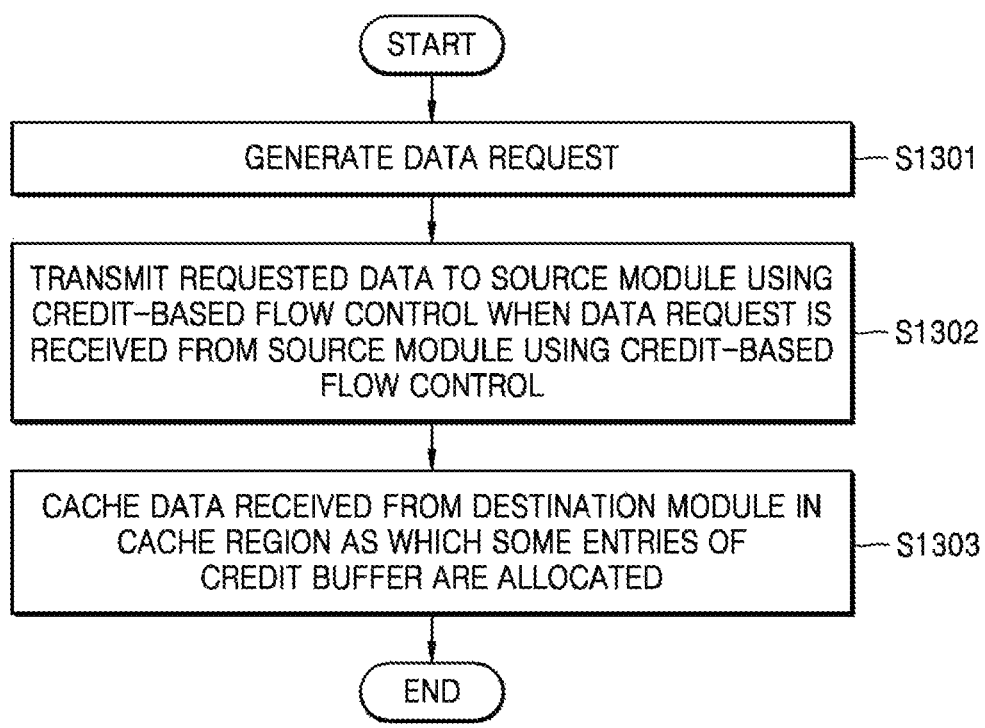
FIG. 13 is a flowchart of a data processing method of a processor according to one or more embodiments.

FIG. 13 is a flowchart of a data processing method of a processor according to one or more embodiments. Any, or any combination, of the above descriptions associated with FIGS. 1-12 are also applicable to the method of FIG. 13, depending on embodiment, and thus corresponding descriptions will be omitted with the below discussion of FIG. 13, noting that embodiments or FIG. 13 are not limited to the same.

In S1301, a source device 210 generates a request of data.

In S1302, when the data request is received from the source device 210 using the credit-based flow control, a destination device 220 transmits the requested data to the source device 210 using the credit-based flow control.

In S1303, the source device 210 caches the data received from the destination device 220 in a cache region 217 as which some entries of a credit buffer 215 are allocated.

The apparatuses, units, modules, devices, and other components illustrated in FIGS. 1-10 and 12 that perform the operations described herein with respect to FIGS. 1-13 are implemented by hardware components. Examples of hardware components include controllers, sensors, generators, drivers, memories, comparators, arithmetic logic units, adders, subtractors, multipliers, dividers, integrators, processors, memories, permanent storage such as a disk drive, communication devices and ports for handling communications with external devices, and user interface devices, including a touch panel, keys, buttons, etc., and any other electronic components known to one of ordinary skill in the art. In one example, the hardware components are implemented by computing hardware, for example, by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 1-13. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-13 that perform the operations described herein with respect to FIGS. 1-10 and 12 are performed by computing hardware, for example, by one or more processors or computers, as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor, the processor comprising:
a source processing device configured to identify data to request from another device; and
a destination processing device configured to, in response to a request for the identified data from the source processing device using credit-based flow control, transmit the identified data to the source processing device using the credit-based flow control,
wherein the source processing device comprises a credit buffer used for the credit-based flow control, the credit buffer being allocable to include a cache region configured to cache the transmitted identified data received by the source processing device;
wherein the source processing device further comprises:
a request first-in first-out (FIFO) buffer configured to store a result of a tag matching determination between an address of the identified data and tags corresponding to data cached in the cache region; and
a controller configured to perform control to read data cached in the cache region using a hit index, indicating which entry of the cache region includes the identified data, when the stored result of the tag matching determination is a cache hit, and to perform control to increase a current write index value for the cache region when the stored result of the tag matching determination is a cache miss.

2. The processor of claim 1, wherein the source processing device selectively sets a write index value for the cache region to indicate which next entry of the cache region to store data next requested and received by the source processing device, based on a determination of whether the identified data is stored in the cache region.

3. The processor of claim 1, wherein the source processing device further comprises a tag matcher configured to perform the tag matching determination between the address of the identified data and the tags corresponding to the data cached in the cache region, to determine whether the identified data is stored in the cache region.

4. The processor of claim 1, wherein the source processing device caches the transmitted identified data in the cache region based on the current write index value when the cache miss occurs and then performs the increasing of the current write index value to indicate where a next received data is to be cached in the cache region.

5. The processor of claim 1, wherein, when data is cached in all entries of the credit buffer allocated to the cache region and there are available entries of the credit buffer that the write index value can be increased to represent, the source processing device deletes data cached in an initial entry of the cache region among the entries allocated in the cache region and transmits a credit grant to the destination processing device in accordance with the credit-based flow control.

6. The processor of claim 1, wherein, when data is cached in all entries of the credit buffer allocated to the cache region and the cache miss occurs while there are no available entries of the credit buffer that the write index value can be increased to represent, the source processing device initializes the write index value to represent an initial entry of the credit buffer.

7. The processor of claim 1, wherein, when the cache miss occurs while data is cached in all entries of the credit buffer that are allocated to the cache region, the controller performs control to transmit a credit grant to the destination processing device in accordance with the credit-based flow control.

8. The processor of claim 1, wherein at least one of the source processing device and the destination processing device is a router or an intellectual property (IP) integrated in the processor.

9. The processor of claim 1, wherein the processor transceives data between a plurality of devices, including the source processing device and the destination processing device, using a network-on-chip (NOC) system.

10. The processor of claim 1, wherein a location of the cache region in the credit buffer is variable.

11. A method of processing data using a processor, the method comprising:
identifying, by a source processing device, data to request from another device;
storing a result of a tag matching determination between an address of the identified data and tags corresponding to data cached in a cache region;
transmitting, by a destination processing device, the identified data to the source processing device in response to a request for the identified data from the source processing device using credit-based flow control; and
caching, in a selectively allocated cache region of a credit buffer of the source processing device, the transmitted identified data as received by the source processing device,
wherein the caching of the transmitted identified data comprises performing control to read data cached in the cache region using a hit index, indicating which entry of the cache region includes the identified data, when the stored result of the tag matching determination is a cache hit or performing control to increase a current write index value for the cache region when the stored result of the tag matching determination is a cache miss.

12. The method of claim 11, wherein the source processing device selectively sets a write index value for the cache region to indicate which next entry of the cache region to store data next received by the source processing device, based on a determination of whether the identified data is stored in the cache region.

13. The method of claim 11, further comprising performing the tag matching determination between the address of the identified data and the tags corresponding to the data cached in the cache region.

14. The method of claim 11, wherein,
the transmitting comprises transmitting the identified data to the source processing device based on the tag matching determination indicating the cache miss, and
the caching of the transmitted identified data comprises caching the transmitted data as received by the source processing device in a select entry of the cache region corresponding to the current write index value and then performing the increasing of the current write index value.

15. The method of claim 11, further comprising:
deleting data cached in an initial entry of the cache region when data is cached in all entries of the credit buffer that are allocated to the cache region, and
transmitting a credit grant to the destination processing device, in accordance with the credit-based flow control, when the data cached in the initial entry is deleted.

16. The method of claim 11, further comprising, when the cache miss occurs while there are no available entries of the credit buffer that the write index value can be increased to represent, initializing the write index value to represent an initial entry of the credit buffer and reallocating the cache region to include the initial entry.

* * * * *